March 15, 1938.　　　A. CRAVARITIS　　　2,110,970
COCKTAIL SHAKER
Filed July 24, 1937　　　2 Sheets-Sheet 1
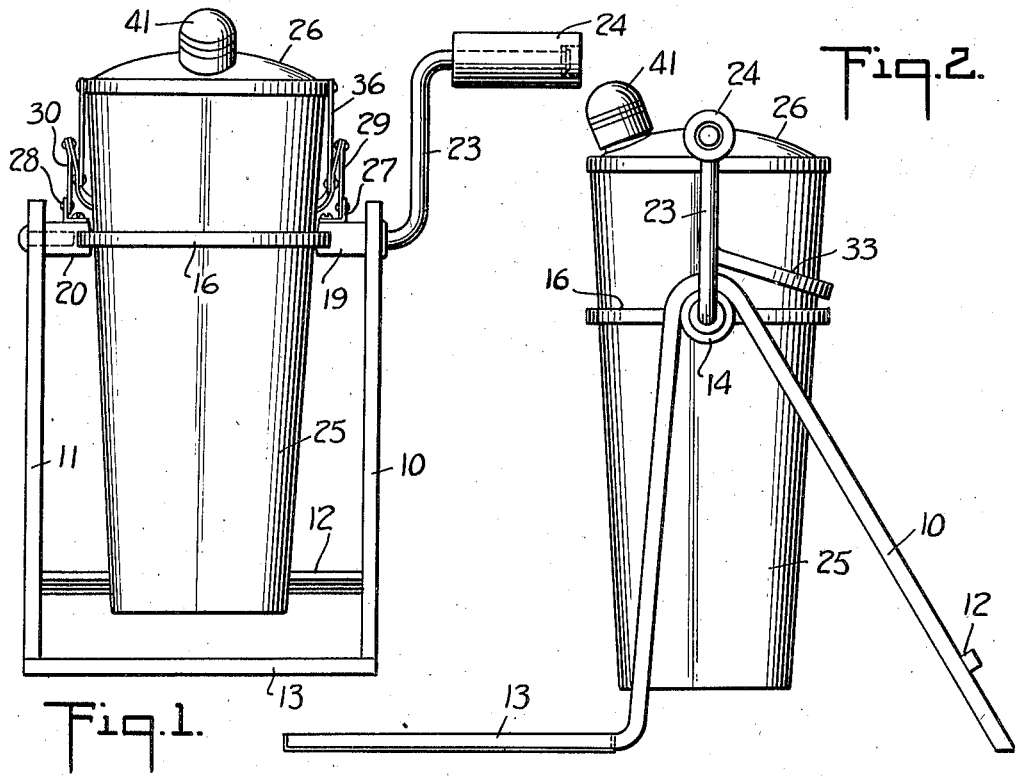
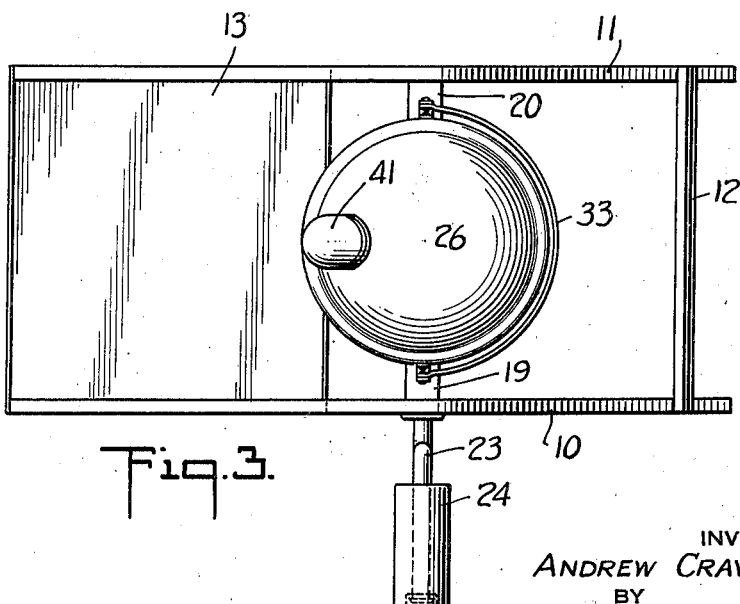
INVENTOR
ANDREW CRAVARITIS
BY
ATTORNEY March 15, 1938.   A. CRAVARITIS   2,110,970
COCKTAIL SHAKER
Filed July 24, 1937   2 Sheets-Sheet 2
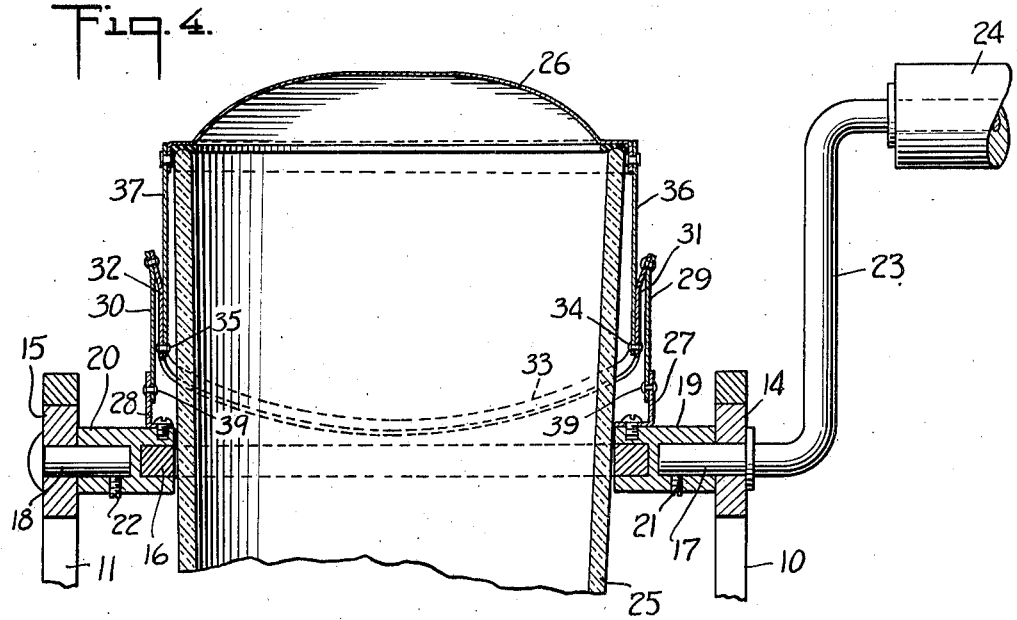
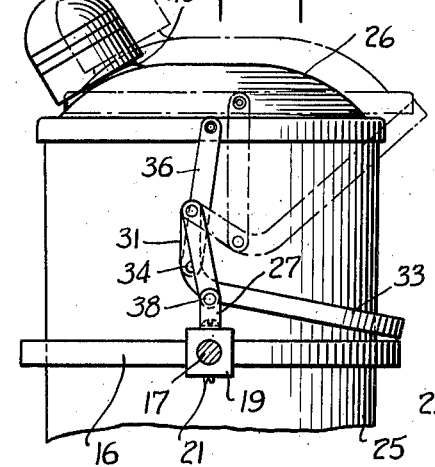
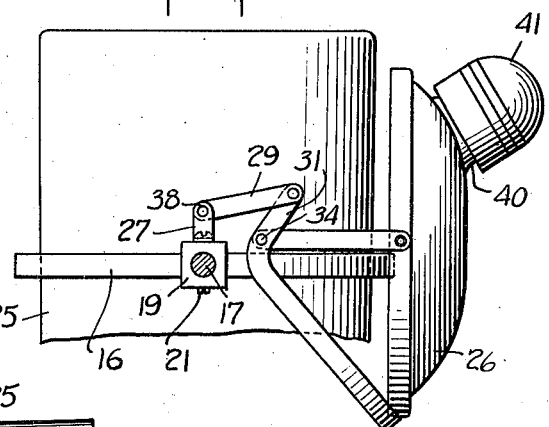
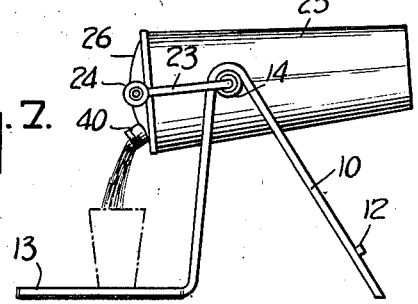
INVENTOR
ANDREW CRAVARITIS
BY
Frederick Breitenfeld
ATTORNEY Patented Mar. 15, 1938

2,110,970

UNITED STATES PATENT OFFICE 2,110,970

COCKTAIL SHAKER

Andrew Cravaritis, New York, N. Y., assignor to National Silver Deposit Ware Co., Inc., New York, N. Y., a corporation of New York Application July 24, 1937, Serial No. 155,428

3 Claims. (Cl. 259—81)

My present invention relates generally to mixers, and has particular reference to cocktail shakers.

It is a general object of the invention to provide a cocktail shaker of novel character, attractive in appearance, easy to manufacture, use, and clean, and unusually efficient in agitating and mixing liquid ingredients.

The present improved cocktail shaker is characterized by the provision of an arrangement which permits a container to be rotated bodily. In accordance with my invention, the container may be in the form of the conventional cocktail mixer, comprising a tapered frustro-conical element having an open top.

Briefly, my invention provides for a supporting base provided with elevated, aligned bearings, a supporting ring journaled between the bearings, a container removably supported in the ring, and a crank handle for rotating the ring and container.

One of the features of my invention lies in constructing the parts in such a manner that the center of gravity of the container is well below the ring, when in normal position, and in arranging the crank handle so that it projects diametrically away from said center of gravity.

Another feature of the invention lies in providing a novel form of cover for the container, together with means for adjusting the cover into and out of operative relation to the container.

In accordance with my invention, the cover is provided with an outlet spout and with a removable closure for the spout.

A still further feature of the present construction lies in the provision of a tray carried by the supporting base on one side of the container, the tray being adapted to support a receptacle such as a cocktail glass, and the outlet spout being so positioned that the contents of the container may be conveniently poured into such receptacle through said spout.

I achieve the foregoing objects, and such other objects as may hereinafter appear or be pointed out, in the manner illustratively exemplified in the accompanying drawings, wherein—

Figure 1 is a front elevational view of a cocktail shaker of the present improved character;

Figure 2 is a side view of the same;

Figure 3 is a plan view;

Figure 4 is an enlarged fragmentary cross-sectional view showing certain details of construction;

Figure 5 is an enlarged fragmentary side view showing certain details of the container cover;

Figure 6 is a view similar to Figure 5 showing the cover in inoperative position; and Figure 7 is a side view showing the manner in which the contents of the container may be poured.

In the illustrated embodiment, the supporting base consists of two spaced rods 10 and 11 which are preferably, but not necessarily, of highly polished metal or the like. These rods are bent to define inverted V's, and the forward portions of the rods are preferably extended horizontally, as indicated most clearly in Figure 2. The rods are maintained in their spaced relationship by the cross brace 12 at the rear and by a similar bracing arrangement at the front. Preferably, the forward bracing arrangement consists of a flat element 13 constructed to serve as a sort of tray. This element is preferably of highly polished metal and has an upstanding rim.

In the upper angles of the rods 10 and 11, I provide the spaced, aligned bearings 14 and 15, these bearings being shown, by way of example, in the form of metallic discs welded or otherwise secured in permanent relation to the rods 10 and 11.

Journaled between the bearings 14 and 15 is the supporting ring 16. This ring may be mounted in the bearings in any suitable or desired manner, and I have illustratively shown one convenient way of journaling this ring in position. Upon referring to Figure 4, it will be observed that a pin 17 is journaled in the bearing 14, while a similar pin 18 is journaled in the bearing 15. Mounted on the pins 17 and 18 are the tubular elements 19 and 20. These elements are permanently secured to the ring 16, by welding or otherwise, and they are secured on the pins 17 and 18 by means of set screws 21 and 22.

The pin 17 carries a crank handle 23 having a grip 24 at its end. This assembly of parts permits rotation, as a unit, of the pins 17 and 18, the elements 19 and 20, and the ring 16.

The ring 16 is adapted removably to accommodate an open-top container 25 which I have illustratively shown in the form of an elongated, slightly tapered glass, although it will be understood that the container may be of other shape or may be composed of metal or other suitable material. The container is of such a size that it may be slipped downwardly through the ring 16, ultimately bracing itself in substantially the position shown in Figures 1 and 2. When thus positioned, the center of gravity of the container is well below the ring 16, and this is an important feature of my invention. It should also be noted that the crank handle 23 extends upwardly in these figures, i. e., this handle projects diametrically away from the center of gravity of the container.

The device is completed by the dome-shaped cover 26 adapted to cooperate with the open top of the container 25 to seal the latter when the device is to be used. In accordance with my invention, this cover is adjustable bodily into and out of operative engagement with the open top of the container 25. More particularly, the adjustability permits the cover 26 to be moved bodily toward and away from the container, as indicated in Figure 5, and also to be swung aside, as indicated in Figure 6, so as to leave the container 25 entirely free and readily removable from the ring 16.

Various mechanisms may be employed for supporting the cover 26 in the desired adjustable manner. I have illustratively shown a preferred arrangement of parts which is illustrated more clearly in Figures 4, 5, and 6. Secured to the elements 19 and 20 (and hence to ring 16) are the fixed brackets 27 and 28. Pivoted to these brackets are the links 29 and 30, and pivoted to the upper ends of these links are the upturned ends 31 and 32 of a yoke 33 which extends arcuately around the container 25. Pivoted to the yoke 33, as at 34 and 35, are the upwardly extending links 36 and 37, these links being pivotally secured at their upper ends to opposite points of the cover 26.

When the cover is in sealing relationship to the container 25, the various elements and links are in the relationship shown in full-lines in Figure 5. To swing the cover aside, the first step is to grasp the yoke 33 and swing it upwardly into the dot-and-dash position of Figure 5. This serves to elevate the links 36 and 37, thereby elevating the cover 26 into the dot-and-dash position of Figure 5. The next step is to swing the cover bodily around the pivots 38 and 39 to bring the cover and the link mechanism into the inoperative position shown in full-lines in Figure 6. The container 25 is then freely accessible for removal from the device, or for subsequent reinsertion into the ring 16.

When the cover is to be applied to the container, the steps are carried out in reverse order. The cover is first swung from the position of Figure 6 to the dot-and-dash position of Figure 5; and the yoke 33 is then forced downwardly to the full-line position of Figure 5. This latter operation clamps the cover downwardly onto the open end of the container 25, thereby sealing the latter. If desired, a suitable rubber washer or gasket may be associated with the cover.

In accordance with my invention, the cover 26 is provided with an outlet spout 40 and with a removable closure 41 for this spout. The spout is arranged near one side of the cover 26 and, as shown most clearly in Figures 2 and 7, the spout is arranged at the side nearer the tray 13.

The operation of the device will be obvious from the description given. With the cover swung aside, as in Figure 6, the desired ingredients of the cocktail or other concoction are inserted into the container 25. Cracked ice or ice cubes may also be inserted. The cover is then swung into operative relation to the container and clamped down. Rotation of the crank handle 23 will thereupon rotate the container and its contents bodily around the horizontal axis defined by the pins 17 and 18. This rotation effects a very efficient mixing and agitation of the ingredients. After the desired agitation has been completed, a cocktail glass or other receptacle is placed on the tray 13, the closure 41 is removed from the spout 40, and the handle 23 is manipulated to swing the container into the pouring position of Figure 7.

Ultimately, the container 25 may be removed for cleaning purposes.

The arrangement of the crank handle 23 in the position shown, with respect to the center of gravity of the container 25, is an important feature of the invention, because it is this relative arrangement of parts which permits the container to be rotated with maximum efficiency and stability of the entire structure. The operation may be said to be "counterbalanced". For example, when the handle is in a horizontal position, the downward pressure of the hand of the operator is counterbalanced by the weight of the container and its contents, all the forces thus working downwardly and tending to stabilize the device. If the handle were arranged otherwise than as shown, there would be a severe tendency to upset the entire device during the rotation of the container. Since the present device is intended for home use and for operation by the ordinary unskilled person, it is highly important that the mixing procedure be as simple, as stable, and as efficient as possible.

In general it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a cocktail shaker, a base provided with elevated aligned bearings, a supporting ring journaled between said bearings, an open-top container removably supported in said ring with its center of gravity well below said ring, a container cover pivotally carried by said ring separately from the container so that it may be swung into and out of operative relation to the top of said container, and a crank handle connected to said ring for rotating the ring and container and thereby agitating the contents of said container, said handle projecting diametrically away from said center of gravity.

2. In a cocktail shaker, a base having elevated aligned bearings, a supporting ring journaled between said bearings for rotary movement, a container having an open top and removably supported in said ring, a cover for said open top of the container, and means for pivotally connecting said cover with the ring for a bodily swinging movement of the cover from sealing relation with the open top of the container to permit filling thereof and for thereafter sealing said open top for rotation of the container.

3. In a cocktail shaker, the combination of a base having elevated aligned bearings, a supporting ring journaled between said bearings for rotary movement, an open top container removably supported in said ring with its center of gravity arranged well below said ring and adapted to receive liquid for agitation, a cover for said container, toggle means between the ring and cover at opposite sides of the container pivotally connecting the container with the ring separate from the container, and a yoke connecting said toggle means together for joint action thereof and to release the toggle means for a swinging movement of the cover from the container to receive the liquid for agitation.

ANDREW CRAVARITIS.